(12) United States Patent
Brijesh

(10) Patent No.: US 9,007,384 B2
(45) Date of Patent: Apr. 14, 2015

(54) DISPLAY PANEL SELF-REFRESH ENTRY AND EXIT

(71) Applicant: Apple Inc., Cupertino, CA (US)

(72) Inventor: Tripathi Brijesh, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 13/718,001

(22) Filed: Dec. 18, 2012

(65) Prior Publication Data

US 2014/0168233 A1    Jun. 19, 2014

(51) Int. Cl.
*G06F 13/14* (2006.01)
*G06F 15/00* (2006.01)
*G06F 15/16* (2006.01)
*G06T 1/20* (2006.01)
*G09G 3/20* (2006.01)
*G09G 5/00* (2006.01)
*G09G 5/12* (2006.01)
*G09G 5/36* (2006.01)

(52) U.S. Cl.
CPC ............. *G06T 1/20* (2013.01); *G09G 3/2096* (2013.01); *G09G 5/003* (2013.01); *G09G 5/006* (2013.01); *G09G 5/12* (2013.01); *G09G 5/363* (2013.01); *G09G 2320/103* (2013.01); *G09G 2330/02* (2013.01); *G09G 2360/18* (2013.01); *G09G 2370/04* (2013.01); *G09G 2370/10* (2013.01)

(58) Field of Classification Search
CPC ............ H04N 21/4305; H04N 21/4302; H04J 3/0658; H04J 3/0638; H04J 3/0635; H04J 3/06
USPC .......................................... 345/501, 502, 520
See application file for complete search history.

(56) References Cited

U.S. PATENT DOCUMENTS

| 2008/0079739 | A1 | 4/2008 | Gupta et al. | |
| 2010/0272102 | A1* | 10/2010 | Kobayashi | 370/389 |
| 2011/0292059 | A1 | 12/2011 | Kobayashi | |
| 2012/0146968 | A1 | 6/2012 | Glen | |
| 2012/0147020 | A1 | 6/2012 | Hussain et al. | |
| 2012/0207208 | A1 | 8/2012 | Wyatt et al. | |
| 2012/0236013 | A1 | 9/2012 | Wyatt et al. | |
| 2012/0262627 | A1* | 10/2012 | Cho et al. | 348/540 |

OTHER PUBLICATIONS

International Search Report and Written Opinion from PCT/US2013/075719, mailed Apr. 4, 2014, Apple Inc., pp. 1-13.

* cited by examiner

*Primary Examiner* — Joni Richer
(74) *Attorney, Agent, or Firm* — Meyertons, Hood, Kivlin, Kowert & Goetzel, P.C.

(57) ABSTRACT

Embodiments of an apparatus for implementing a display port interface are disclosed. The apparatus may include a source processor and a sink processor coupled through an interface. The sink processor may be operable to send a synchronization signal to the source processor through the interface. The source processor may be operable, dependent upon the synchronization signal, to send data to the sink processor.

14 Claims, 12 Drawing Sheets

DISPLAY PANEL SELF-REFRESH ENTRY AND EXIT

BACKGROUND

1. Technical Field

This invention is related to the field of processor communication, and more particularly to the implementation of display port interfaces between processors.

2. Description of the Related Art

Display technology for computer systems continues to evolve. From the first Cathode Ray tubes (CRTs), new display technologies have emerged including Liquid Crystal Display (LCD), Light Emitting Diode (LED), Eletroluminescent Display (ELD), Plasma Display Panel (PDP), Liquid Crystal on Silicon (LCoS), for example. Additionally, computer systems may employ multiple displays, projectors, televisions, and other suitable display devices.

To support the growing number of display technologies and the need to connect to multiple displays, interface technologies between processors and displays have developed into complex systems that may support platform-independent operation, networked operation, "plug and play" connections, and the like. Additionally, new interface technologies, such as, e.g., High-Definition Multimedia Interface (HDMI), Video Graphics Array (VGA), Digital Visual Interface (DVI), or Embedded Display Port (eDP), may need to support legacy display types. In some cases, newer interface technologies may exploit the support for legacy display types by transmitting secondary data during time intervals, which are not utilized by legacy devices.

SUMMARY OF THE EMBODIMENTS

Various embodiments of an apparatus implementing a display port interface are disclosed. Broadly speaking, an apparatus and a method are contemplated in which a source processor and sink processor are coupled through an interface. The sink processor may be configured to send a synchronization signal to the source processor via the interface. The source processor may be configured to transmit data, dependent on the synchronization signal, through the interface to the sink processor.

In one embodiment, the interface may include a primary and an auxiliary link. The interface may also include a hot plug detect link.

In a further embodiment, the sink processor may be configured to send the synchronization signal to the source processor via the hot plug detect link.

BRIEF DESCRIPTION OF THE DRAWINGS

The following detailed description makes reference to the accompanying drawings, which are now briefly described.

Figure 1:
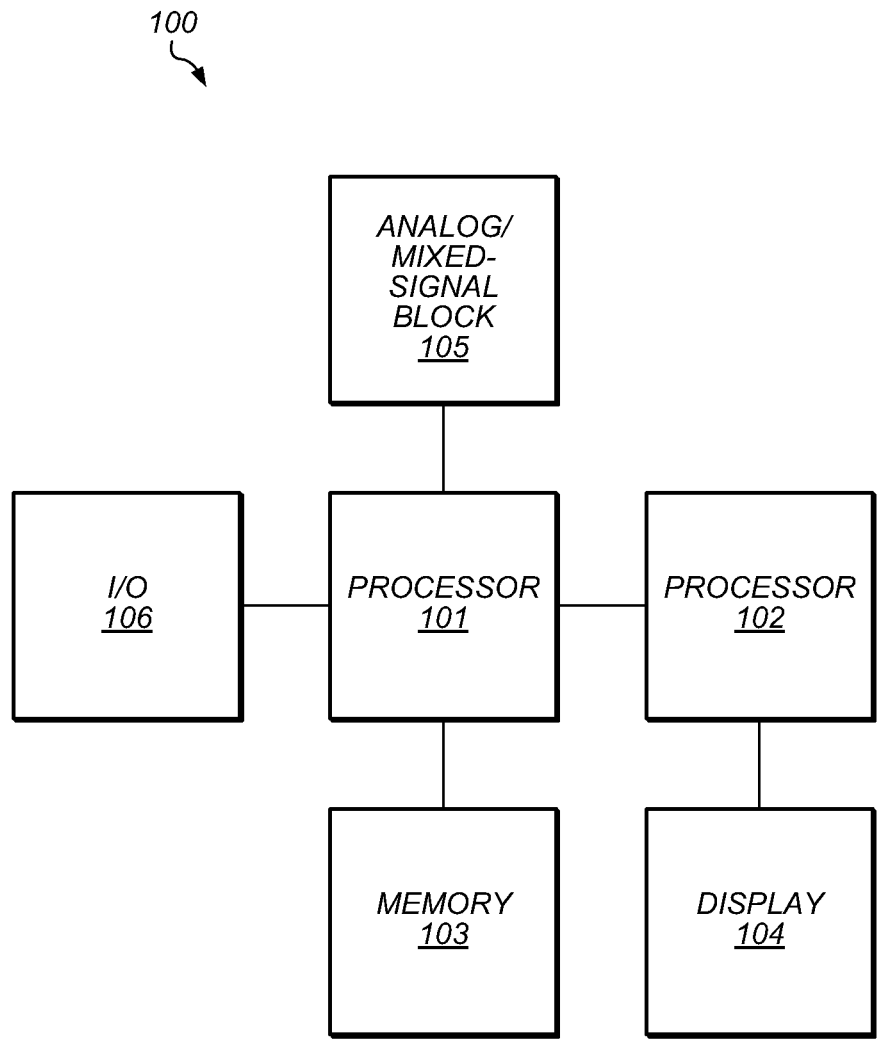
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A computer system may include one or more functional blocks, such as, e.g., processors, memories, etc., coupled to a display. A dedicated processor or display controller may be coupled directly to the display and may control the flow of graphics data to the display from other processors within the computer system. Multiple displays with respective display controllers may be employed in some computer systems.

Specialized interfaces may be employed between processors and display controllers within a computer system. The interfaces may support multiple display types, and multiple numbers of display controllers and processors. Moreover, the interfaces may have modes of operation, which may allow for reduced power operation of the interface, and transmission of initialization or operation parameters from a processor to a display controller.

Computer System Overview

A block diagram of a computer system is illustrated in FIG. 1. In computer system 100, processor 101 is coupled to memory block 103, analog/mixed signal block 105, I/O block 106, and to processor 102. Processor 102 is further coupled to display 104. In various embodiments, computer system 100 may be configured for use in mobile computing applications such as, e.g., a tablet, a laptop computer or a cellular telephone.

Processors 101 and 102 may, in various embodiments, be representative of general-purpose processors that perform computational operations. For example, processors 101 and 102 may be central processing units (CPU) such as a microprocessor, microcontrollers, application-specific integrated circuits (ASICs), or field-programmable gate arrays (FPGAs). In some embodiments, processors 101 and 102 may implement any suitable instruction set architecture (ISA), such as, e.g., the ARM™, PowerPC™, or x28 ISAs, or a combination thereof.

Memory block 103 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH Memory, or a Ferroelectric Random Access Memory (FeRAM), for example. It is noted that in the embodiment of a computer system illustrated in FIG. 1, a single memory block is depicted. In other embodiments, any suitable number of memory blocks may be employed.

Analog/mixed-signal block 105 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 105 may be configured to perform power management tasks with the inclusion of on-chip power supplies and voltage regulators. Analog/mixed-signal block 105 may also include, in some embodiments, radio frequency (RF) circuits that may be configured for operation with cellular telephone networks.

I/O block 106 may be configured to coordinate data transfer between processor 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 106 may be configured to implement a version of Universal Serial Bus (USB) protocol or IEEE 1394 (Firewire®) protocol.

I/O block 106 may also be configured to coordinate data transfer between processor 101 and one or more devices (e.g., other computer systems or system-on-chips) coupled to processor 101 via a network. In one embodiment, I/O block 106 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 106 may be configured to implement multiple discrete network interface ports.

Display element 104 may include any suitable type of display such as a Liquid Crystal Display (LCD), Light Emitting Diode (LED), Eletroluminescent Display (ELD), Cathode Ray Tube (CRT), Plasma Display Panel (PDP), Liquid Crystal on Silicon (LCoS), for example. Although a single display element is shown in the embodiment of a computer system illustrated in FIG. 1, in other embodiments, any suitable number of display elements may be employed.

Figure 2:
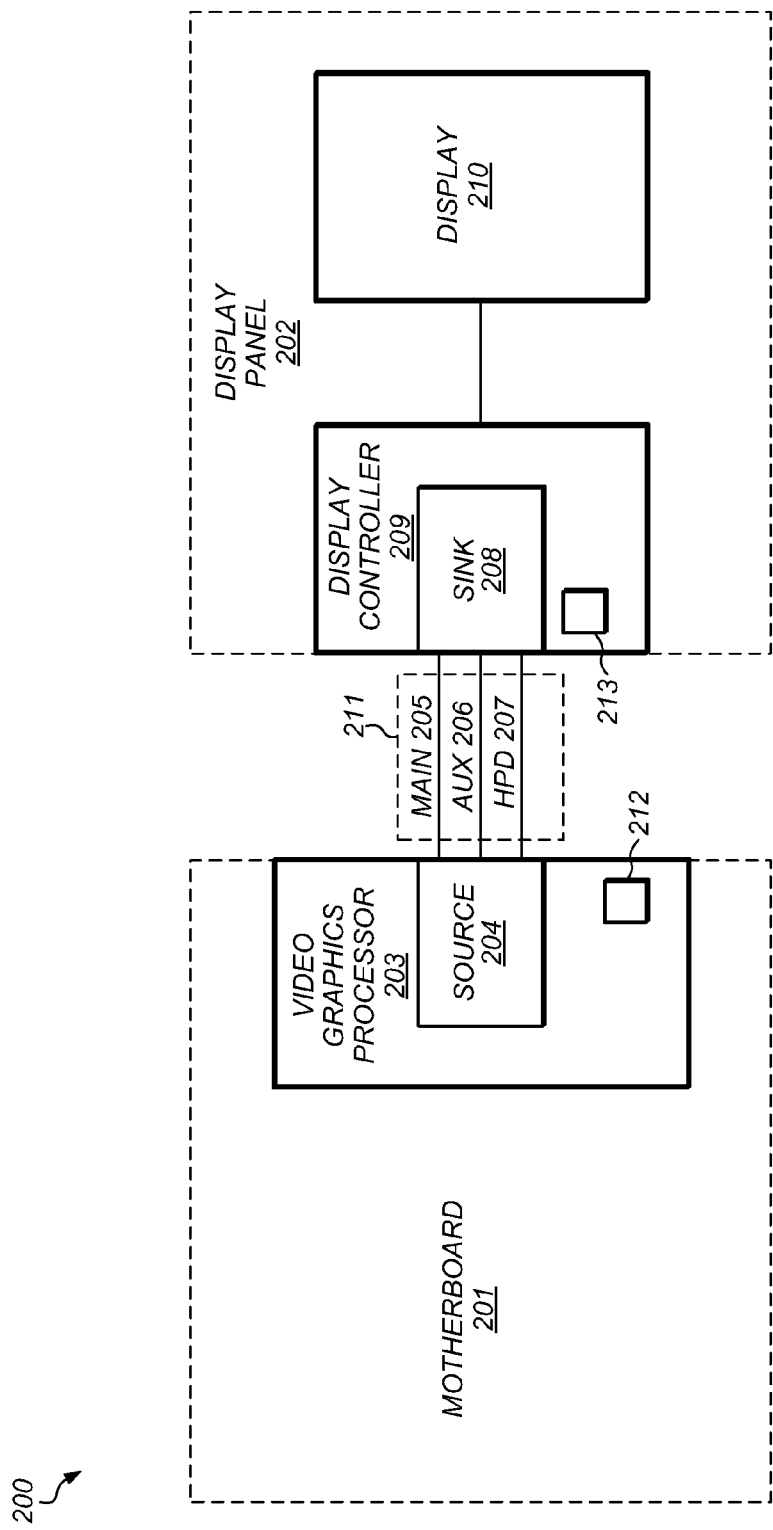
FIG. 2 illustrates another embodiment of a computing system.

Turning to FIG. 2, another embodiment of a computer system is illustrated. In computer system 200, motherboard 201 is coupled to display panel 202 through display port 211.

Motherboard 201 includes video processor 203, and display panel 202 includes display controller 209 and display 210. In some embodiments, video processor 203 may correspond to processor 101 of computer system 100 as illustrated in FIG. 1, and display controller 209 may correspond to processor 102 of computer system 100 as illustrated in FIG. 1.

Video processor 203 includes display port source physical layer (PHY) 204 and timing generator 212, and display controller 209 includes display port sink PHY 208 and timing generator 213. Timing generators 212 and 213 may, in some embodiments, include PLLs or other suitable phase locking circuitry, and oscillator circuits suitable (not shown) for providing a timing reference for transmitted and received data. In various embodiments, display port source PHY and display port sink PHY may implement any suitable display interface standard such as, High-Definition Multimedia Interface (HDMI), Video Graphics Array (VGA), Digital Visual Interface (DVI), or Embedded Display Port (eDP), for example.

Video processor 203 and display controller 209 may be implemented as dedicated processing devices. In various other embodiments, video processor 203 and display controller 209 may be implements as general purpose processors that are configured to executed program instructions stored in memory, such as memory block 103 of computer system 100 as illustrated in FIG. 1.

Display port 211 includes main link 255, auxiliary link 206, and hot plug detect (HPD) link 207. As described below in more detail with reference to FIG. 3 and FIG. 4, data may be transmitted from display port source PHY 204 to display port sink PHY 208 using main link 205. Auxiliary link 206 may be used by either display port source PHY 204 or display port sink PHY 208 to transmit command signals. Although three link types are depicted in the embodiment of display port 211 illustrated in FIG. 2, in other embodiments, different number of links may be employed.

HPD link 207 may be used by display port source PHY 204 to detect the presence of display panel 202. In various embodiments, bias resistors (not shown) may be coupled to HPD link 207, and display port sink PHY 208 may include a pull-up device or a pull-down device coupled to HPD link 207 and configured to charge or discharge HPD link 207 to achieve the desired logic level. Any pull-up device or pull-down device may include one or more metal-oxide field-effect transistors (MOSFETs). HPD link 207 may, in some embodiments, be used by display port sink PHY 208 to transmit signals, such as, e.g., a synchronization signal, to display port source PHY 204.

In some embodiments, main link 205 may include a data bus, consisting of multiple signal lines, that is configured to employ a clock data recovery (CDR) methodology. For example, data may be sent from source PHY 204 to sink PHY 208 without an accompanying clock signal. Sink PHY 208 may generate a clock signal based on an approximate frequency reference. The generated clock may then be phase aligned to transitions in the transmitted data using a phase-locked loop (PLL) or any other suitable phase detection circuitry.

In order to correct for drift in frequency of the PLL's oscillator, the transmitted data must contain a sufficient number of transitions to align the generated clock. The transmitted data may be encoded to ensure sufficient transitions. In some embodiments, the transmitted data may be encoded using 8B/10B, Manchester, or any other suitable type of encoding method. Although CDR was described above in the context of main link 205, in various embodiments, all or part of the CDR method may be employed on auxiliary link 206 as well.

It is noted that "low" or "low logic level" refers to a voltage at or near ground and that "high" or "high logic level" refers to a voltage sufficiently large to turn on an re-channel MOSFET and turn off a p-channel MOSFET. In other embodiments, different technology may results in different voltage levels for "low" and "high."

It is noted that the computer system illustrated in FIG. 2 is merely an example. In other embodiments, different numbers of functional blocks and links, and different arrangements of functional blocks are possible and contemplated.

Figure 3:
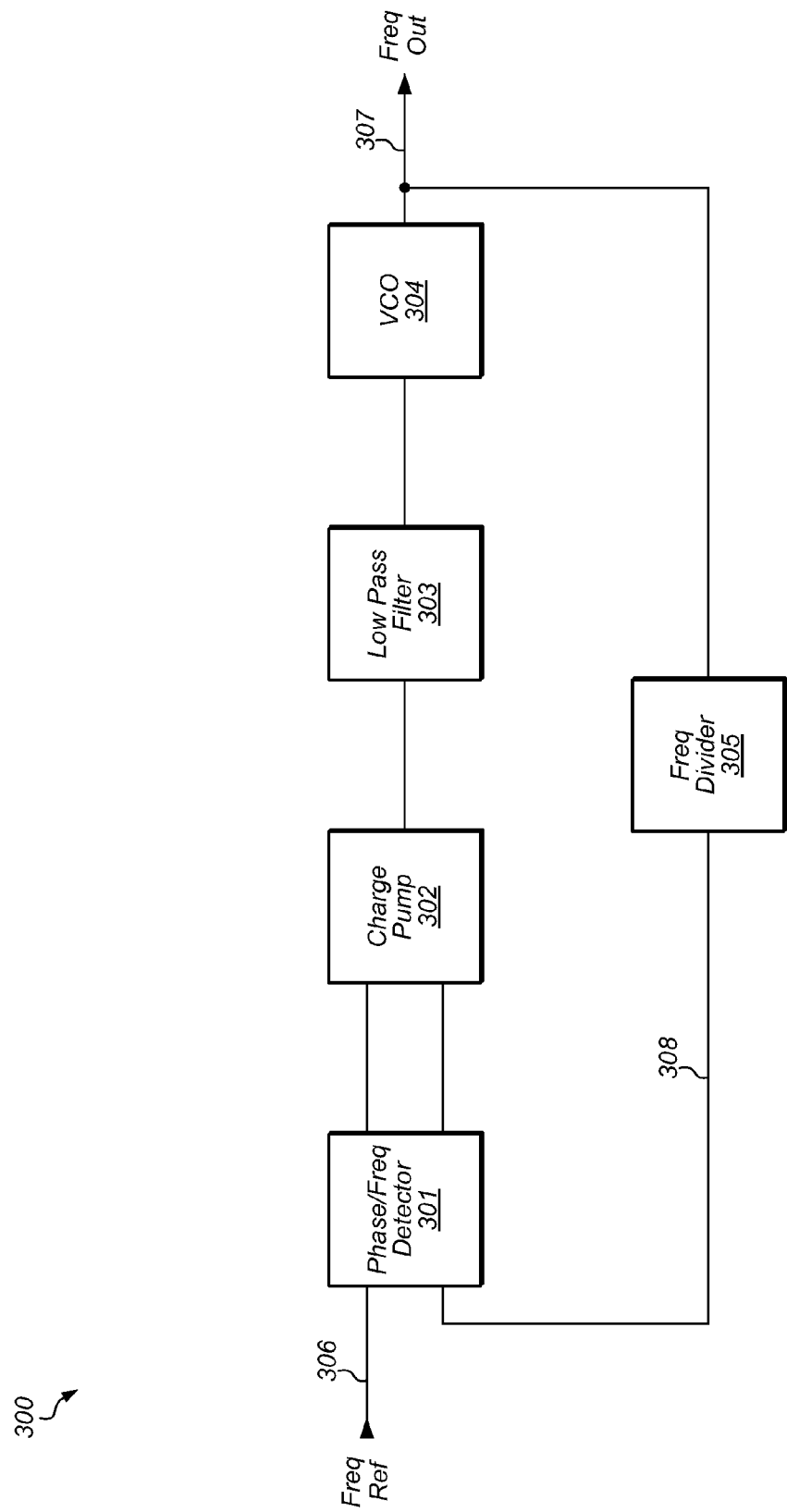
FIG. 3 illustrates a block diagram of a phase-locked loop.

Turning to FIG. 3, a block diagram of an embodiment of a phase-locked loop is illustrated, which may correspond to a PLL included in timing generators 212 and 213 as illustrated in FIG. 2. In the illustrated embodiment, PLL 300 includes phase frequency detector 301, change pump 302, low pass filter 303, voltage-controlled oscillator (VCO) 304, and frequency divider 305. The inputs of phase detector 301 are coupled to reference input 306 and the output of frequency divider 305. The outputs of phase detector 301 are coupled to the inputs of change pump 302. The output of charge pump 302 is coupled to the input of VCO 304 through low pass filter 303. Output 307 is coupled to the output of VCO 304 and to the input of frequency divider 305.

Phase frequency detector 301 may be configured to compare reference input 306 and the output of frequency divider 308, and to generate one or more error signals proportional to the phase difference between the compared signals. In some embodiments, phase frequency detector 301 may be implemented by summing the output of two analog multipliers, such as, double balance diode mixer or a four-quadrant multiplier (Gilbert Cell), for example. Phase frequency detector 301 may, in some embodiments, implemented using exclusive-OR logic gates, flip-flops, or any other suitable combination of digital logic gates.

Charge pump 302 may be configured to charge and discharge a capacitor dependent upon the output of phase frequency detector 301. In some embodiments, phase frequency detector 301 provides two output signals, commonly referred to as "up" and "down," which may signal charge pump to source current to the capacitor, or sink current from the capacitor, respectively. In such cases, the voltage across the capacitor is proportional to the phase difference between reference input 306 and the output of frequency divider 305. Charge pump 302 may, in various embodiments, employ p-channel MOSFETs to source current to the capacitor, and n-channel MOSFETs to sink current from the capacitor. In other embodiments, a resistor may be added in series with the capacitor to improve stability of the circuit.

Low pass filter 303 (also referred to as a "loop filter") may be configured to remove high-frequency noise on the output of charge pump 302. In some embodiments, the cutoff frequency of the low pass filter may be selected to determine the capture range of PLL 300. Low pass filter 303 may, in some embodiments, be implemented as a passive filter consisting of resistors and capacitors. In other embodiments, low pass filter 303 may be implemented as an active filter employing an amplifier, such as, e.g., an operational amplifier (commonly referred to as an "op-amp") and a feedback path, which may include both resistors and capacitors.

Voltage-controlled oscillator 304 may be configured to output a frequency dependent upon the filtered output of charge pump 302, and may be implemented as either a harmonic oscillator, or a relaxation oscillator, or any other suitable oscillator circuit topology. In some embodiments, a varying current may charge or discharge a capacitor thereby adjusting the frequency of VCO 304. The varying current may be dependent upon the output of charge pump 302, which may be used to adjust current sources with VCO 304. In other embodiments, the output of charge pump 302 may be employed to adjust the gain of amplifier stages, which are coupled together in a ring.

Frequency divider 305 may be configured to divide frequency output 307 by a predetermined value. The resultant divided frequency may then be input to phase frequency detector 301, thereby allowing for a frequency on frequency output 307 that is different than reference input 306. In some embodiments, frequency divider 305 may include one or more flip-flops configured to divide their input frequency by a factor of two. Frequency mixers or multipliers may, in other embodiments, be included in frequency divider 305.

During operations, a pre-determined frequency is applied to reference input 306. In some embodiments, a crystal oscillator, an RC oscillator, an LC oscillator, or any suitable circuit for generating a frequency reference may be employed to generate the pre-determined frequency. Phase frequency detector 301 then compares the input frequency to the output of frequency divider 305. Initially, the input frequency and the output of frequency divider 305 may differ in frequency and phase. In some embodiments, the pre-determined frequency must be within a range of frequencies in order for PLL 300 to operate. This range may be referred to as a "capture range" and may be a function of the bandwidth of the low pass filter 303 as well as the capabilities of VCO 304.

When the pre-determined frequency is higher than the frequency of the output of frequency divider 305, phase frequency detector may signal to charge pump 302 to add charge to a capacitor included within the charge pump. When the pre-determined frequency is lower than the frequency of the output of frequency divider 305, phase frequency detector 301 may signal to charge pump 302 to remove charge from the capacitor. In other embodiments, the signal to charge pump 302 to add or subtract charge from the capacitor, may operate in a reverse fashion from the description above, i.e., when the pre-determined frequency is lower than the frequency of the output of frequency divider 305, phase frequency detector 301 may signal to charge pump 302 to add charge to the capacitor, and vice versa.

The voltage across the capacitor included within the charge pump may then be filter through low pass filter 303. High frequency components of the voltage level across the capacitor may be the result of power supply noise, switching noise within charge pump 302, and the like. Low pass filter 303 may provide a low impedance to ground for the aforementioned high frequency components, thereby preventing them from entering VCO 304.

VCO 304 may then generate an output signal at a frequency corresponding to the voltage output from low pass filter 303. The output of VCO 304 may be buffered and used a clock or timing reference within a functional block such as video processor 203 or display controller 209 as illustrated in FIG. 2. In some embodiments, the frequency of the output of VCO 304 may be divided by frequency divider 305, and input to phase frequency detector 301. As described above, frequency divider 305 may, in some embodiments, include frequency mixers and multipliers, which may allow for the output of VCO 304 to be higher or lower in frequency than the input pre-determined frequency, while still being in phase with the input frequency. When the output of frequency divider 305 is in phase with the pre-determined frequency, PLL 300 is said to be "locked." Variations in phase between the two signals induced by changes in the input frequency, fluctuations in power supply voltage, etc., will be compensated by the feedback with PLL 300 in order to maintain the phase relationship between the two signals.

It is noted that PLL 300 as illustrated in FIG. 3 is merely an example. In other embodiments, different functional blocks, and different implementations of functional blocks are possible and contemplated.

Display Port Operation

Figure 4:
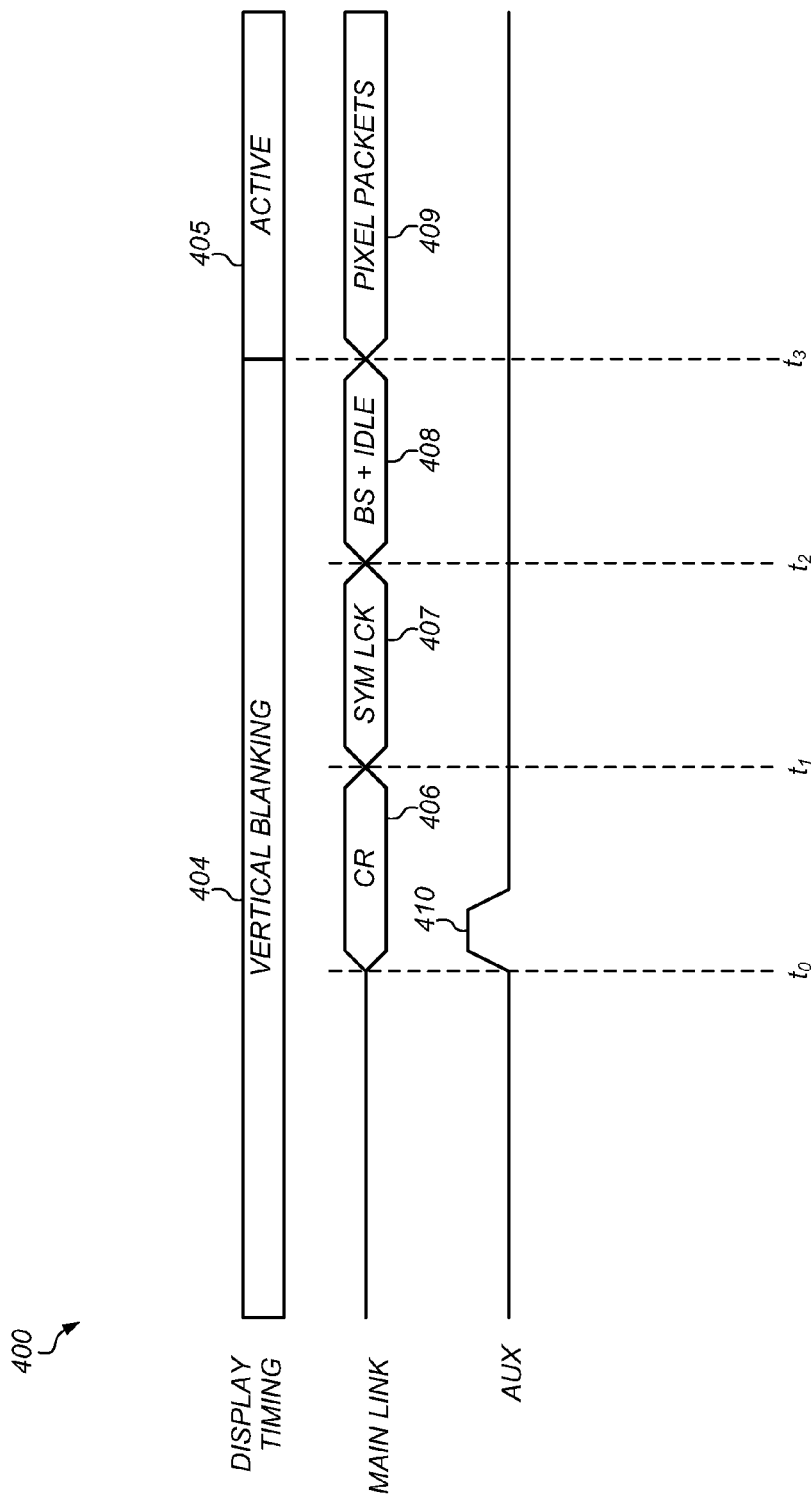
FIG. 4 depicts example waveforms illustrating an embodiment of a wake-up procedure.

Example waveforms depicting the operation of a display port are illustrated in FIG. 4. Referring collectively to the computer system 200 illustrated in FIG. 2, and waveforms 400, display port 211 may be in a sleep mode prior to time $t_0$. During this time, display 210 may be in a period of vertical blanking and main link 205 may be inactive.

At time $t_0$, source PHY 204 transmits wake-up command 410 on auxiliary link 206 to sink PHY 208. Wake-up command 410 may include an indication that the frequency on main link 205 has changed and that clock recovery and lock may need to be performed. It is noted that in various embodiments, wake-up command 410 may be encoded using 8B/10B, Manchester-II, or any other suitable encoding method. Source PHY 204 also transmits operation parameter CR 406 on main link 205. In some embodiments, operation parameter CR 406 may contain a number of clock recovery symbols to be used in sink PHY 208 to recover a clock from transmitted data.

Once operation parameter CR 406 has been transmitted, source PHY 204 transmits operation parameter symbol lock 407 at time $t_1$. In some embodiments, symbol lock 407 may include the number of training pattern symbols required for sink PHY 208 to achieve symbol lock. The training pattern symbols may include TPS2 or TPS3 as defined in the Embedded DisplayPort (eDP) specification.

With the conclusion of the transmission of symbol lock 407, source PHY 204 then transmits at time $t_2$, operation parameter BS & Idle 408. In some embodiments, BS & Idle 308 may include a number of lines before display 210 goes active. The lines sent to display 210 may include a blanking start framing symbol, or any other suitable framing symbol that may be sent to display 210 during an inactive period.

At time $t_3$, source PHY 204 begins transmission of pixel packets 409. The transmission of pixel packets may continue until another blanking period is initiated. The pixel packets may include packets relating to number of pixels in a horizontal line, the total number of lines in a video frame, horizontal and vertical synchronization widths, in addition to actual video data.

The waveforms and operation illustrated in FIG. 4 are merely an example. In other embodiments, different commands and different orders of commands are possible.

Figure 5:
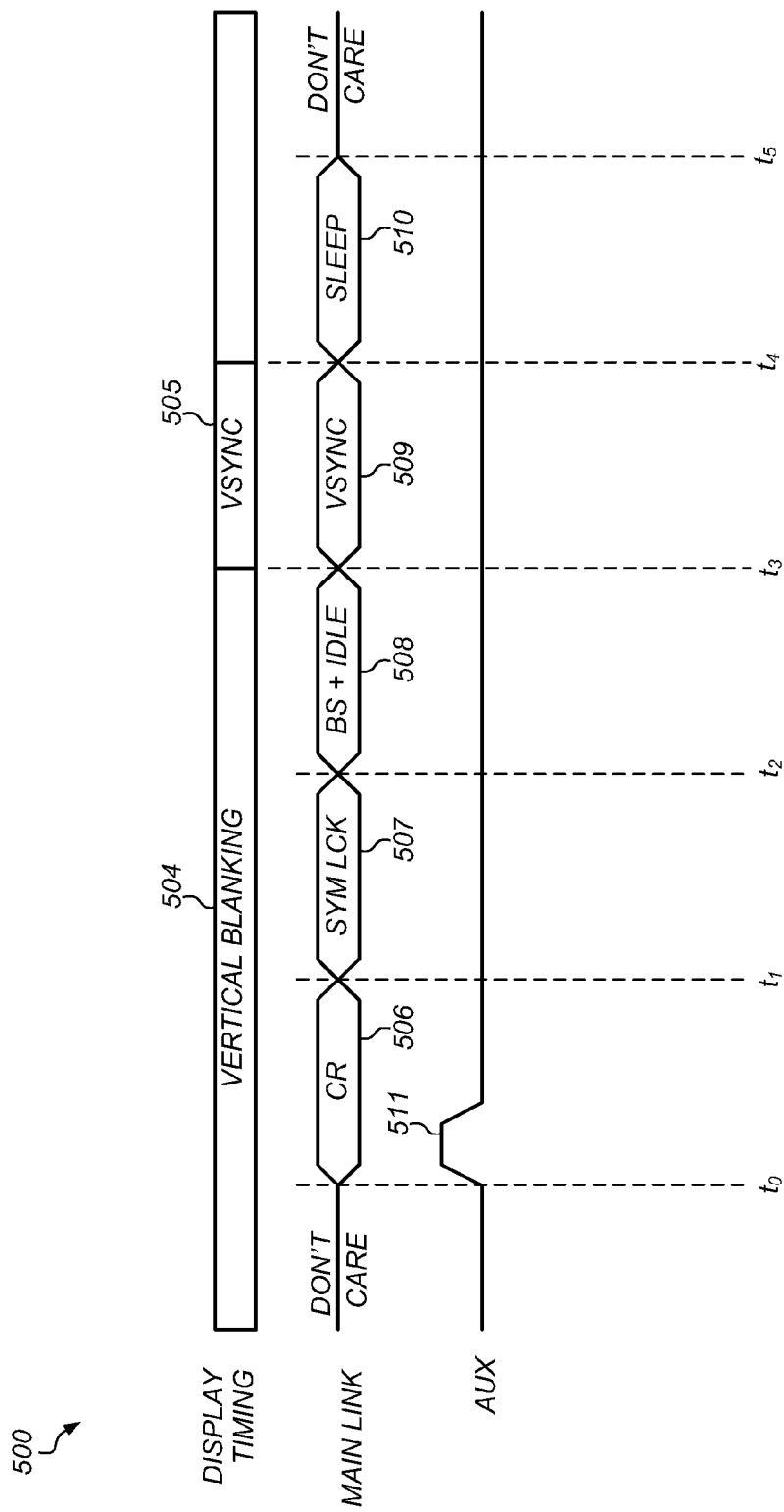
FIG. 5 depicts example waveforms illustrating another embodiment of a wake-up procedure.

Waveforms depicting the wake-up operation of a display port are illustrated in FIG. 5. Referring collectively to computer system 200 illustrated in FIG. 2 and waveforms 500, display port 211 may be in a sleep mode and display 210 may be in a horizontal or vertical blanking mode prior to time $t_0$. In some embodiments, during the period of time prior to time $t_0$, display 210 may in a self-refresh mode (commonly referred to as "panel self-refresh" or "PSR") during which display controller 209 may rely on an internal PLL or other suitable timing reference circuit to send data to display 210. Prior to time $t_0$, the logical state of main link 205 may be a logical-1, a logical-0, or a high impedance state. When the state of a signal can be any allowable logic level, the value of the signal is commonly referred to as a "don't care."

At time $t_0$, source PHY 204 may issue wake-up command 511 via auxiliary link 206. Wake-up command 511 may, in some embodiments, instruct sink PHY 208 to end a sleep or reduced power mode and enable receivers coupled to main link 205. In various embodiments, wake-up command 511 may be encoded using 8B/10B, Manchester-II, or any other suitable encoding method. Source PHY 204 may also transmits initialization parameter CR 506 on main link 205. In some embodiments, operation parameter CR 506 may contain a number of clock recovery symbols to be used in sink PHY 208 to recover a clock from transmitted data.

Once operation parameter CR 506 has been transmitted, source PHY 204 transmits initialization parameter symbol lock 507 at time $t_1$. In some embodiments, symbol lock 507 may include the number of training pattern symbols required for sink PHY 208 to achieve symbol lock. The training pattern symbols may include TPS2 or TPS3 as defined in the Embedded DisplayPort (eDP) specification, or any other suitable training pattern.

With the conclusion of the transmission of symbol lock 507, source PHY 204 then transmits at time $t_2$, initialization parameter BS & Idle 508. In some embodiments, BS & Idle 508 may include a number of lines before display 210 goes active. The lines sent to display 210 may include a blanking start framing symbol, or any other suitable framing symbol that may be sent to display 210 during an inactive period.

As described above, during the period prior to time $t_0$, display controller 209 and display 210 may be performing self-refresh. While performing self-refresh, the timing reference of display controller 209 may loose synchronization with the timing reference of video processor 203. When self-refresh mode is exited, visual artifacts (commonly referred to as "display tearing" or "screen tearing") may be visible on display 210 due to the difference between the two aforementioned timing references. In some embodiments, synchronization signals may be sent between video processor 203 and display controller 209 to reduce differences between the timing references of the two components.

At time $t_4$, source PHY 204 may transmit synchronization signal 509. In some embodiments, synchronization signal 509 may a vertical synchronization signal that may be used to synchronize a PLL or other timing reference circuit in display controller 209 to the timing reference within graphics processor 203. During vertical synchronization, display controller 209 may not send new graphics data to display 210 until the active refresh of display 210 is complete.

Once the transmission of synchronization signal 509 is complete, source PHY 204 may transmit sleep command 510. In some embodiments, sleep command 510 may signal to sink PHY 208 to power-down input receivers associated with main link 205 to conserve power. Display 210 may remain in PSR or may also enter a reduced power mode. Once sink PHY 208 has entered a reduced power state, the logical state of main link 205 may be a logical "don't care."

The waveforms and operation illustrated in FIG. 5 are merely an example. In other embodiments, the wake-up operation may include different command or different numbers of commands, and different initialization or operational parameters may be employed.

Figure 6:
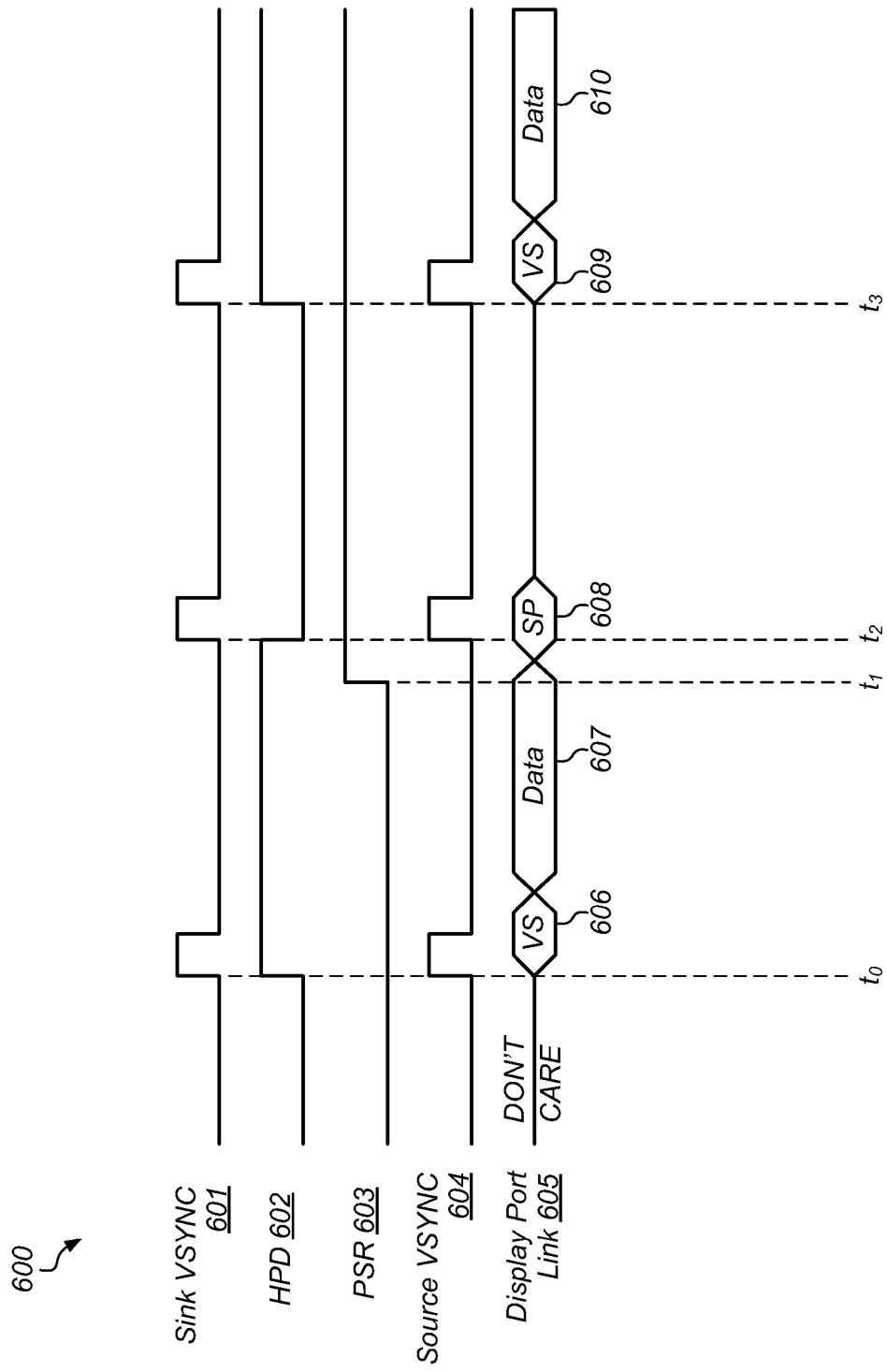
FIG. 6 depicts example waveforms illustrating a synchronization procedure.

Turning to FIG. 6, waveforms depicting the wake-up operation of a display port are illustrated. Referring collectively to computer system 200 illustrated in FIG. 2 and waveforms 600, display port 211 may be in a sleep mode and display 210 may be in a PSR mode prior to time $t_0$. At time $t_0$, sink PHY 208 may generate a VSYNC signal 601. In some embodiments, sink PHY 208 may receive an external timing reference signal and employ timing generator circuit 203 to generate VSYNC signal 601. Once VSYNC signal 601 has been generated, sink PHY 208 may transmit the signal to source PHY 204 via HPD link 207 resulting in waveform HPD 602. In other embodiments, display port 211 may include a dedicate link for sink PHY 208 to transmit VSYNC signal 601.

When source PHY 204 receives HPD signal 602, source PHY 204 may generate source VSYNC 604. In some embodiments, source PHY 204 may employ timing generator circuit 212 to generate source VSYNC 604, by phase locking an internal signal to the received HPD signal 602. Using source VSYNC 604, source PHY 204 may then send a vertical synchronization command 606, followed by data 607 to sink PHY 208. In some embodiments, data 607 may include graphics data, or initialization parameters such as CR 406 as illustrated in FIG. 4. Vertical synchronization command 606 and data 607 may, in some embodiments, be encoded using Manchester-II encoding or any other suitable encoding method.

At time $t_1$, PSR mode may be selected as illustrated in waveform PSR 603. In response to the selection of PSR mode, source PHY 204 may transmit the sleep command 608. In various embodiments, sleep command 608 may signal to sink PHY 208 to enter a low power mode, specifically turning off receivers coupled to main link 205. Sleep command 608 may, in other embodiments, signal to sink PHY 208 to perform other operations.

Another pulse is generated on sink VSYNC 601 at time $t_2$. The pulse on sink VSYNC 601 may then trigger a change in the logical state of HPD 602. The change in the logical state of HPD 602 may then signal to source PHY 204 to generate another pulse on source VSYNC 604. In some embodiments, the transmission of sleep command 608 may be in response to the pulse on source VSYNC 604.

At time $t_3$, another pulse is generated on sink VSYNC 601. As before, the pulse on VSYNC 601 triggers a change in the logical state of HPD 602, which, in turn, triggers the generation of a pulse on source VSYNC 604. Source PHY 204 may then transmit vertical synchronization command 609 to sink PHY 208, followed by the transmission of data 610. In some embodiments, data 610 may include a command to exit PSR mode. Data 610 may, in other embodiments, include data to update graphics or video being displayed on display 210. It is noted that the waveforms illustrated in FIG. 6 are merely an example. In other embodiments, different waveforms may be possible Turning to FIG. 7, an example wake-up command is illustrated. In some embodiments, the wake-up command depicted in FIG. 7 may correspond to wake-up command 410 as illustrated in FIG. 4 or wake-up command 511 as illustrated in FIG. 5, and may be transmitted by a source PHY coupled to a display interface. Command 700 may be transmitted on an auxiliary link such as, auxiliary link 206 of display port 211 as illustrated in FIG. 2, for example, and may consist of one or more parts.

Prior to the beginning of the transmission of the command at time $t_0$, the link may be pre-charged. In various embodiments, the link may be pre-charged to the power supply voltage, to a ground level, or to any suitable pre-charge voltage level. At time $t_0$, the transmission of PREAMBLE 702 begins. In the illustrated embodiment, PREAMBLE 702 consists of eight consecutive logical-0 values (low logic levels), although in other embodiments, any suitable combination of logical-1 values and logical-0 values may be employed.

Once the transmission of the preamble is complete at time $t_1$, the transmission of WAKE_F_CHANGE 703 begins. In command 700, WAKE_F_CHANGE 703 includes a sequence of a logical-0 value followed by two logical-1 values, and a concluding logical-0 value. In various embodiments, different combinations of logical-0 values and logical-1 values may be employed to implement the WAKE_F_CHANGE command. The WAKE_F_CHANGE may, in some embodiments, indicate that the frequency on a primary link such as, e.g., main link 205 as illustrated in FIG. 2, has changed.

At time $t_2$, the transmission of WAKE_F_CHANGE 703 concludes, and the transmission of STOP 704 begins. STOP 704 includes a sequence of two logical-1 values followed by two logical-0 values, although other combinations of logical values may be employed in different embodiments. Once the transmission of STOP 704 concludes at time $t_3$, the transmission of command 700 is complete.

Figure 7:
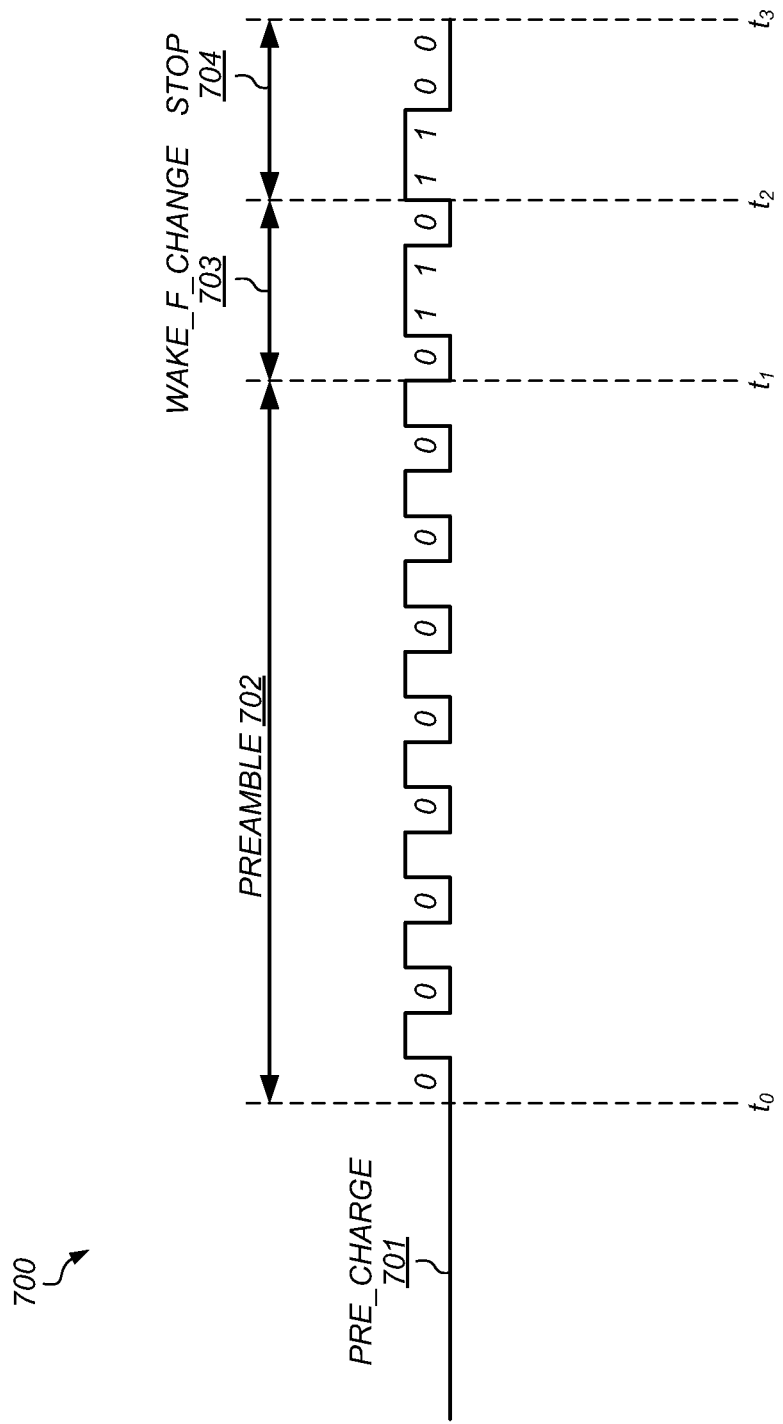
FIG. 7 depicts an example waveform illustrating a wake-up command.

It is noted that the command illustrated in FIG. 7 is merely an example. In other embodiments, different combinations of logical values and different command parts may be employed.

Figure 8:
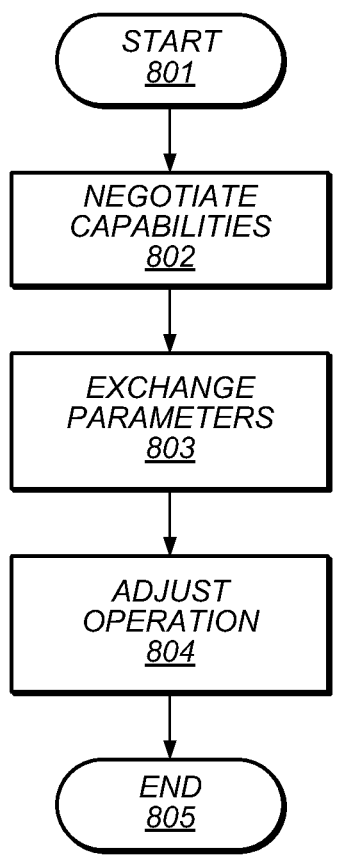
FIG. 8 depicts a flowchart illustrating a method training a link.

Referring to FIG. 8, an example method of adjusting operation of a plurality of components through an interface is illustrated. The method begins in block 801. The components connected through the interface then negotiate one or more component capabilities (block 802). In some embodiments, the negotiation may involve each of the plurality of components identifying each other as being compliant with an interface standard, such as, eDP, for example.

Once the negotiation is complete, the components may exchange one or more parameters (block 803). The exchanged parameters may include settings that govern the operation of the components, such as a data rate setting, or transceiver settings, for example. The operation of the components is then adjusted based upon the exchanged parameters (block 804). In various embodiments, the components may adjust their respective transceivers to adopt the data rate received during the exchange of parameters. Power consumption mode settings may also be adjusted in response to exchanged parameters.

In some embodiments, the data rate setting (or the transmission frequency of data) may be selected from a pre-determined set of frequencies. The selection may be dependent upon physical characteristics of the interface and the negotiation process. In other embodiments, a source component may select the transmission frequency from a continuous range of selectable frequencies, and other sink components may adjust the sampling of transmitted data dependent upon the transmission frequency. The continuous range of selectable frequency is determined by at least, the frequency range of timing generator circuits in the source component, and the capture range of a PLL or other suitable phase locking circuit in a sink component.

The method illustrated in FIG. 8 is merely an example. In other embodiments, different operations or different orders of operation are possible.

Figure 9:
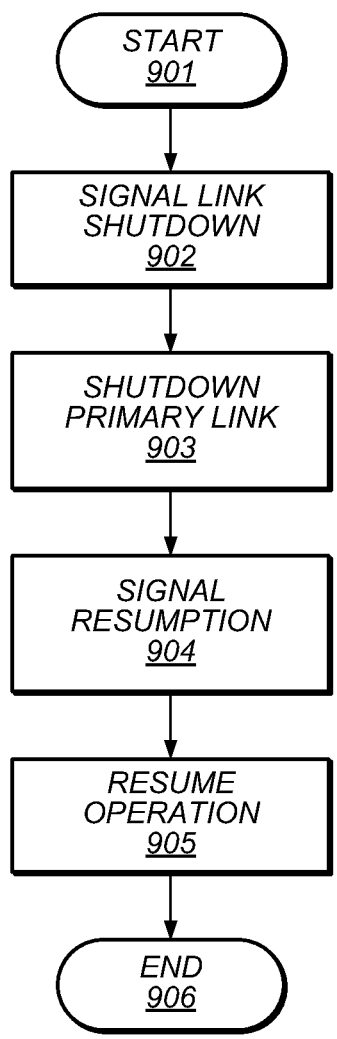
FIG. 9 depicts a flowchart illustrating a method of a sleep and wake-up procedure.

A flowchart illustrating a method of operating a display port such as, e.g., display port 211 as illustrated in FIG. 2, is depicted in FIG. 9. The method begins in block 901. A termination of operation of the display port is then signaled from a display port source to a display port sink in block 902. The termination of operation may be in order to enter a power savings mode. In some embodiments, the termination may be specific to a main or primary link of the display port, such as, main link 205 of display port 211 as depicted in FIG. 2. The signal of termination of operation may be transmitted on either a primary or auxiliary link of the display port.

The operation of a primary link may then be terminated in block 903. In various embodiments, the termination may include the cessation of a portion of the primary link's operational capabilities. All of the operational capabilities of the primary link may be ceased in other embodiments.

In block 904, the display port source transmits a signal to the display port sink to resume operation. In some embodiments, the signal to resume operation may be sent using an auxiliary link of the display port. The signal to resume operation may include multiple parts such as, e.g., command 700 as illustrated in FIG. 7. In various embodiments, additional commands or operational parameters, such as, a number of clock recovery symbols for clock data recovery, may be sent from the display port source to the display port sink before the transmission of data can resume. Such commands and parameters, such as those described above in reference to FIG. 4 and FIG. 5 may be sent via the primary link of the display port before the resumption of data transmission.

Once any additional command or operational parameters have been transmitted, normal operation of the display port may resume with the transmission of data (block 906). The method then concludes in block 907. Although the various operations depicted in the method illustrated in FIG. 9 are shown as being performed in a sequential fashion, in other embodiments, one or more of the operations may be performed in parallel.

Figure 10:
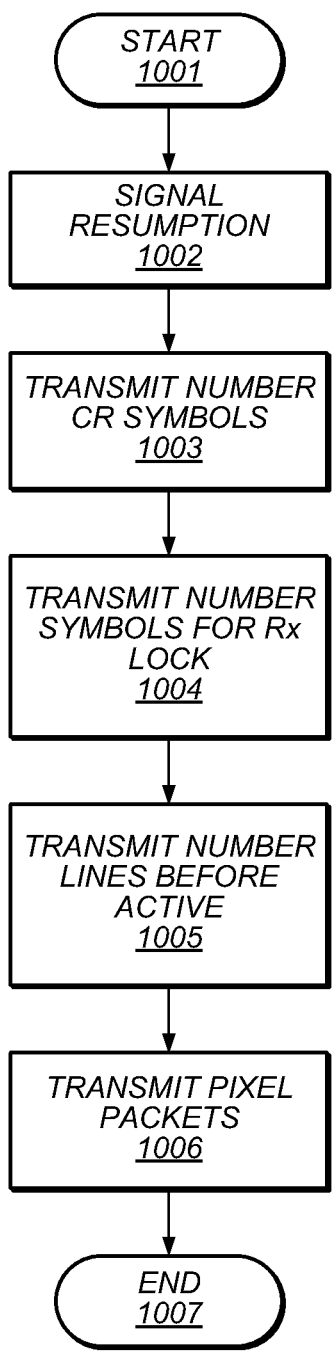
FIG. 10 depicts a flowchart illustrating a method of adjusting changing a link clock frequency.

Turning to FIG. 10, a method of changing link clock frequency of a display port during a sleep or standby period is illustrated. The method begins in block 1001 with the display port in a sleep or standby mode. A signal to resume operation may then be sent by the display port source to the display port sink (block 1002). In some embodiments, the signal to resume operation may be sent via an auxiliary link of the display port.

Once the signal to resume operation has been transmitted, the display port source then sends a parameter to govern clock recovery of a new clock frequency (block 1003). The parameter may include, in some embodiments, a number of clock recovery symbols necessary to perform clock data recovery.

The display port source may then send a number of symbols required for training of the link (block 1004). In some embodiments, the symbols used for training may be specialized training symbols such as TPS2 or TPS3 as defined in the Embedded DisplayPort (eDP) specification. In other embodiments, any suitable training symbol pattern may be employed.

An idle parameter may then be sent from display port source (block 1005). In some embodiments, the idle parameter may include a number of lines before resumption of active operation of a display coupled to the display port sink. The number of lines may, in various embodiments, refer to a number of framing symbols such as, e.g., the blanking start (BS) framing symbol as defined in the Embedded DisplayPort (eDP) specification.

With the completion of the transmission of the idle parameter, the display port source may then transmit pixel or graphics data to the display port sink (block 1006). In some embodiments, the pixel or graphics data may include video data from one or more video sources such as, a Digital Versatile Disc (DVD), for example. The method then concludes (block 1007). It is noted that the method illustrated in FIG. 10 is merely an example. In other embodiments, different operations and different orders of operations are possible and contemplated.

Figure 11:
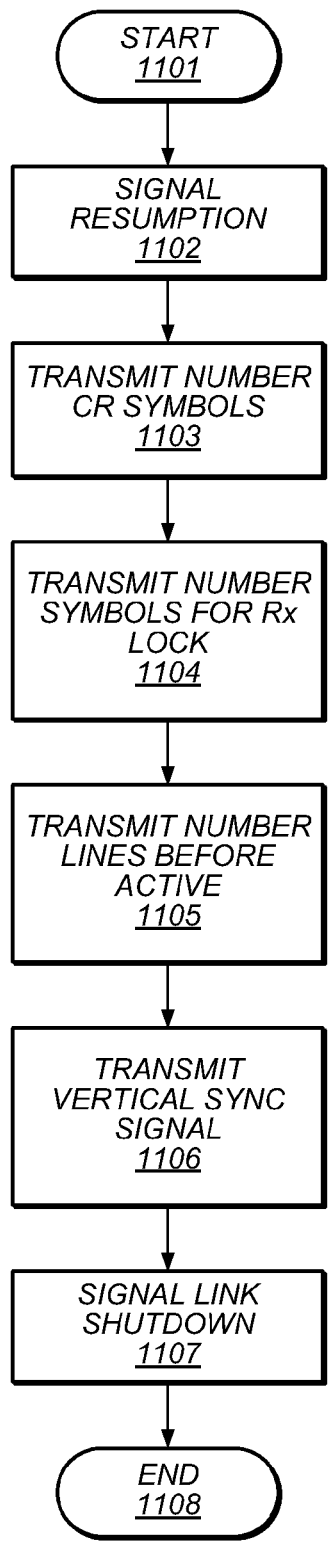
FIG. 11 depicts a flowchart illustrating a method of maintaining vertical synchronization.

A method for maintaining vertical synchronization on a display is illustrated in FIG. 11. The method begins in block 1101 with a display port interface between a processor and a display controller in a sleep or low-power mode. During this time, the display controller and its associated display may be performing self-refresh. A signal to resume operation may then be sent by the processor to the display controller (block 1102). In some embodiments, the signal to resume operation may be sent via an auxiliary link of the display port interface.

Once the signal to resume operation has been transmitted, the processor may then send a parameter to govern clock recovery by the display controller of a new clock frequency (block 1103). The parameter may include, in some embodiments, a number of clock recovery symbols necessary to perform clock data recovery, and may be transmitted on a primary link of the display port interface. In other embodiments, the clock frequency may not change from a previous active period of the display port interface.

The processor may then send a number of symbols required for training of the link (block 1104). In some embodiments, the symbols used for training may be specialized training symbols such as TPS2 or TPS3 as defined in the Embedded DisplayPort (eDP) specification, and may be sent on the primary link of the display port interface. In other embodiments, any suitable training symbol pattern may be employed to train the display port interface.

An idle parameter may then be sent from processor (block 1105). In some embodiments, the idle parameter may include a number of lines before resumption of active operation of a display coupled to the display port sink. The number of lines may, in various embodiments, refer to a number of framing symbols such as, e.g., the blanking start (BS) framing symbol as defined in the Embedded DisplayPort (eDP) specification. In some embodiments, the idle parameter may be transmitted on the primary link of the display port interface.

With the completion of the transmission of the idle parameter, the processor may then send a synchronization signal to the display controller (block 1106). In some embodiments, the synchronization signal may be a vertical synchronization signal, and may be employed by the display controller to adjust the phase and/or frequency of a timing reference circuit such as a PLL, for example. The phase and/or frequency of the timing circuit may be adjusted to match the phase and/or frequency of a timing reference circuit within the processor such as, e.g., a PLL or crystal oscillator.

Once the synchronization signal has been transmitted, the processor may then send a sleep or shutdown signal (block 1107). In some embodiments, the sleep or shutdown signal may be sent on the primary link of the display port interface, and may signal the display controller to power-down receivers coupled to the primary link of the display port interface. The display controller and its associated display may remain in self-refresh mode after the receipt of the sleep or shutdown signal by the display controller. The method then concludes in block 1108.

It is noted that the operations depicted in the method illustrated in FIG. 11 are shown as being performed sequentially. In other embodiments, all or some of the operations may be performed in parallel.

Figure 12:
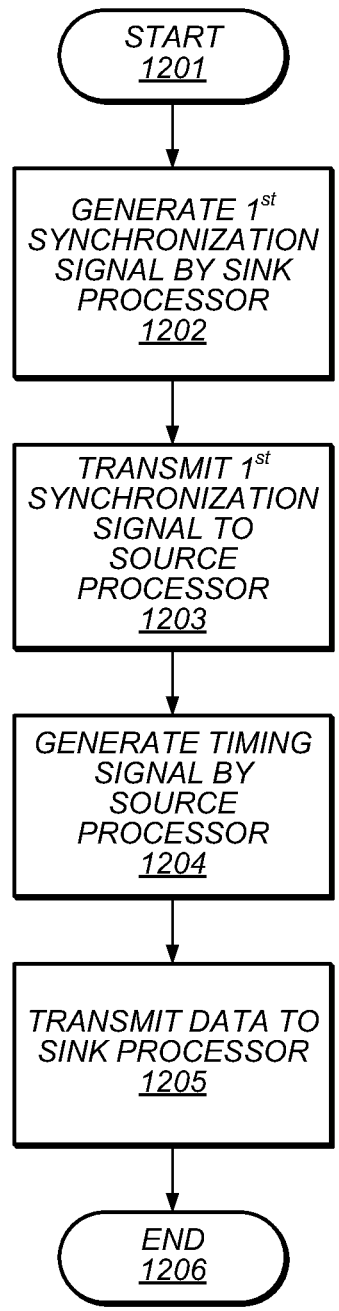
FIG. 12 depicts a flowchart illustrating another method of maintaining vertical synchronization.

Turning to FIG. 12, another method of maintaining synchronization between a source processor and a sink processor coupled by an interface, such as display port 211 as depicted in FIG. 2, for example, is illustrated. The method begins in block 1201. The sink processor may then generate a first synchronization signal (block 1202). In some embodiments, the sink processor may receive a timing reference signal from an external source, such as, e.g., a crystal oscillator, an RC oscillator, an LC oscillator, and the like. The received timing reference signal may used as an input to a phase locking circuit, such as, a PLL, as part of the generation of the first synchronization signal. In other embodiments, a variable oscillator, such as a VCO, for example, may used to generate the first synchronization signal.

The sink processor may then transmit the first synchronization signal to the source processor via the interface (block 1203). In some embodiments, the interface may include three links, i.e., a primary link, an auxiliary link, and a hot plug detect (HPD) link, and the source processor may transmit the first synchronization signal via the HPD link. Although three links have been described, in various other embodiments, additional links may be included in the interface, and a dedicated link for the transmission of the first synchronization signal may be employed.

Once the first synchronization signal has been received by the source processor, the first synchronization signal may be used to generate a timing signal (block 1204). In some embodiments, the first synchronization signal may be used as an input to any suitable phase locking circuit, such as, a PLL, for example, as part of the generation of the timing signal. The generated timing signal may, in other embodiments, be used to generate a second synchronization signal.

The generated timing signal may then be used by the source processor to transmit data to the sink processor (block 1205). In some embodiments, the source processor may transmit the data via the primary link of the interface. The data may include graphics or video data, commands and initialization parameters, such as those described above in reference to FIG. 4 and FIG. 5. In other embodiments, the data may include a vertical synchronization command which may correspond to the second synchronization signal. The sink processor may receive the data and perform operations as described above in reference to FIG. 4 and FIG. 5.

With the transmission of the data, the method concludes in block 1206. It is noted that the method illustrated in FIG. 12 is merely an example. In other embodiments, different operations and different orders of operations are possible and contemplated.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a source processor; and
   a sink processor coupled to the source processor through a display port interface, wherein the sink processor is configured to send a synchronization signal to the source processor via the interface, wherein the synchronization signal includes at least a first pulse;
   wherein the source processor is configured to transmit data to the sink processor via the interface dependent upon the first pulse of the synchronization signal;
   wherein the display port interface comprises a primary link, an auxiliary link, and a hot plug detect (HPD) link; and
   wherein the sink processor is further configured to send the synchronization signal to the source processor via the HPD link.

2. The apparatus of claim 1, wherein the sink processor is further configured to receive a timing reference signal.

3. The apparatus of claim 2, wherein the sink processor is further configured to generate the synchronization signal dependent upon the received timing reference signal.

4. A method, comprising:
   transmitting, by a first component, a synchronization signal to a second component through a display port interface, wherein the synchronization signal includes at least a first pulse;
   generating, by the second component, a timing signal dependent upon the first pulse of the transmitted synchronization signal; and
   transmitting, by the second component, through the display port interface, data to the first component dependent upon the generated timing signal;
   wherein the display port interface includes a primary link, and auxiliary link, and a hot plug detect (HPD) link; and
   wherein transmitting the synchronization signal further comprises sending the synchronization signal through the HPD link.

5. The method of claim 4, wherein the transmitted data includes graphics data.

6. The method of claim 4, wherein the transmitted data includes a plurality of initialization parameters.

7. A system, comprising:
   a memory;
   a first processor coupled to the memory, wherein the first processor includes a first timing generator circuit;
   a second processor coupled to the first processor through an interface, wherein the second processor includes a second timing generator circuit; and
   a display coupled to the second processor;
   wherein the second timing circuit is configured to generate a synchronization signal, wherein the synchronization signal includes at least a first pulse;
   wherein the second processor is configured to transmit the synchronization signal to the first processor;
   wherein the first timing circuit is configured to generate a timing signal dependent upon the first pulse of the synchronization signal; and
   wherein the first processor is configured to transmit data through the interface to the second processor dependent upon the timing signal;
   wherein the interface includes a primary link, an auxiliary link, and a hot plug detect (HPD) link; and
   wherein to transmit the synchronization signal the second processor is further configured to send the synchronization signal via the HPD link.

8. The system of claim 7, wherein to generate the timing signal comprises phase locking to the synchronization signal.

9. The system of claim 7, wherein the transmitted data includes graphics data.

10. A method, comprising:
    receiving, by a first processor, a timing reference signal;
    generating, by the first processor, a first synchronization signal dependent upon the timing reference signal, wherein the first synchronization signal includes a first plurality of pulses;
    transmitting, through a display port interface by the first processor, the first synchronization signal to a second processor;
    generating a second synchronization signal, by the second processor dependent upon each pulse of the first plurality of pulses of the first synchronization signal, wherein the second synchronization signal includes a second plurality of pulses; and
    transmitting, through the display port interface by the second processor, the second synchronization signal to the first processor;
    wherein generating the first synchronization signal comprises phase locking to the timing reference signal;
    wherein the display port interface includes a primary link, an auxiliary link, and a hot plug detect (HPD) link; and
    wherein transmitting the first synchronization signal further comprises sending the first synchronization signal through the HPD link.

11. The method of claim 10, further comprising transmitting through the display port interface, by the second processor, data to the first processor dependent upon the second synchronization signal.

12. A non-transitory computer accessible storage medium having program instructions stored therein that, in response to execution by a computer system, causes the computer system to perform operations including:
- transmitting by a first component, a synchronization signal to a second component through a display port interface, wherein the synchronization signal includes at least a first pulse;
- generating, by the second component, a timing signal dependent upon the first pulse of the transmitted synchronization signal;
- transmitting, by the second component, through the display port interface, data to the first component dependent upon the generated timing signal;
- wherein the interface includes a primary link, and auxiliary link, and a hot plug detect (HPD) link; and
- wherein transmitting the synchronization signal further comprises sending the synchronization signal through the HPD link.

13. The non-transitory computer accessible storage medium of claim 12, wherein the transmitted data includes graphics data.

14. The non-transitory computer accessible storage medium of claim 12, wherein the transmitted data includes a plurality of initialization parameters.

\* \* \* \* \*